United States Patent
In et al.

(10) Patent No.: US 8,937,601 B2
(45) Date of Patent: Jan. 20, 2015

(54) METHOD AND APPARATUS OF RECOGNIZING GESTURE WITH UNTOUCHED WAY

(75) Inventors: Hoh Peter In, Seoul (KR); Jungyeon Kim, Chungcheongnam-do (KR); Do-Hoon Kim, Seoul (KR); Sangbong Park, Union City, CA (US)

(73) Assignee: Korea University Research and Business Foundation, Seoul (KR)

( * ) Notice: Subject to any disclaimer, the term of this patent is extended or adjusted under 35 U.S.C. 154(b) by 343 days.

(21) Appl. No.: 13/226,877

(22) Filed: Sep. 7, 2011

(65) Prior Publication Data

US 2012/0075176 A1 Mar. 29, 2012

(30) Foreign Application Priority Data

Sep. 8, 2010 (KR) ........................ 10-2010-0088084

(51) Int. Cl.
*G06F 3/041* (2006.01)
*G06F 3/0488* (2013.01)
*G06F 3/01* (2006.01)

(52) U.S. Cl.
CPC ............ *G06F 3/04883* (2013.01); *G06F 3/041* (2013.01); *G06F 3/017* (2013.01); *G06F 2203/04108* (2013.01)

USPC .......................................... 345/173; 345/156

(58) Field of Classification Search
CPC .......... G06F 2203/04108; G06F 3/017; G06F 3/041; G06F 3/04883
USPC .................................................. 345/156, 173
See application file for complete search history.

(56) References Cited

U.S. PATENT DOCUMENTS

| | | | |
|---|---|---|---|
| 2004/0193413 A1* | 9/2004 | Wilson et al. | ................. 704/243 |
| 2009/0315740 A1* | 12/2009 | Hildreth et al. | ................. 341/20 |
| 2010/0295773 A1* | 11/2010 | Alameh et al. | ................ 345/156 |

FOREIGN PATENT DOCUMENTS

KR 10-2010-0000174 A 1/2010

* cited by examiner

*Primary Examiner* — Viet Pham
(74) *Attorney, Agent, or Firm* — Alston & Bird LLP

(57) ABSTRACT

Provided is a method of recognizing a gesture, which includes: storing sensing information of a sensor in a case where the sensing information is obtained by sensing an object within a preset distance from the sensor; and recognizing a gesture from the stored sensing information, wherein said storing of sensing information stores the sensing information obtained by the sensor during a preset time after the sensor senses an object within the preset distance. This method allows a terminal and contents to be controlled by recognizing a gesture of a user even though the user does not touch the terminal screen.

16 Claims, 11 Drawing Sheets

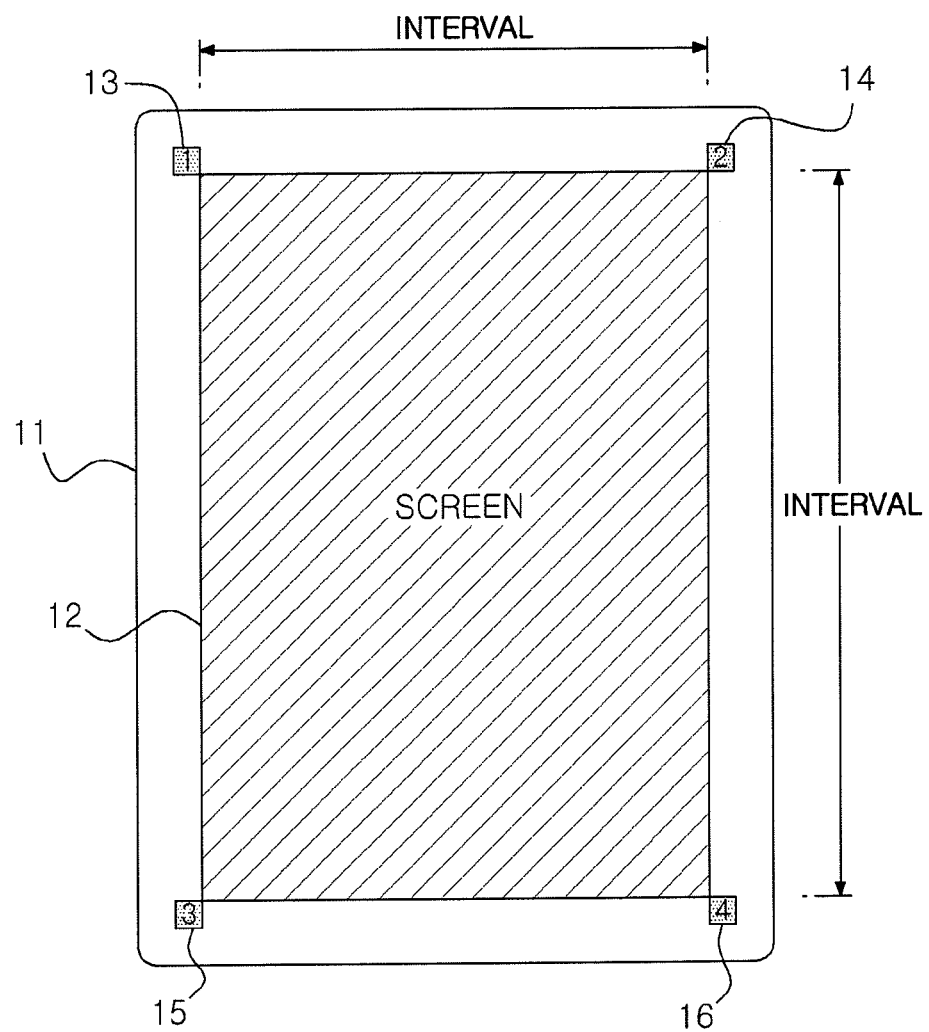

METHOD AND APPARATUS OF RECOGNIZING GESTURE WITH UNTOUCHED WAY

CROSS-REFERENCE TO RELATED APPLICATIONS

This application claims priority under 35 U.S.C. §119 to Korean Patent Application No. 10-2010-0088084, filed on Sep. 8, 2010, in the Korean Intellectual Property Office, the disclosure of which is incorporated herein by reference in its entirety.

TECHNICAL FIELD

The following disclosure relates to a method of recognizing a gesture with an untouched way, and in particular, to a method and apparatus of recognizing a gesture with an untouched way, which allows a terminal and contents to be controlled by recognizing a gesture of a user even though the user does not touch a terminal screen.

BACKGROUND

Recently, along with the propagation of portable terminals, the use of visual multimedia contents such as moving pictures, games, photographs, e-Book or the like using potable terminals explosively increases. In order to express such contents more realistically and graphically, terminals equipped with high-quality displays are put into the market, and the display size also tends to increase. However, conventional potable terminals need a space for an input interface of the terminals such as key buttons and a keypad, and therefore there is a limit in increasing the display size.

If a touch-type interface is used, the above problem can be solved. However, if the touch screen is used, the screen may be damaged due to fingerprints or scratches, and if such damages are repeatedly generated, the sensitivity of the touch region is also deteriorated, which may make the touch screen give input signals inappropriately.

Therefore, there is needed a scheme which may replace an existing input interface without touching a screen.

SUMMARY

An embodiment of the present invention is directed to providing a gesture recognizing method capable of controlling a terminal and contents by recognizing a gesture of a user even though the user does not touch a terminal screen.

Another embodiment of the present invention is directed to providing a control signal generating method capable of allowing easy input by defining various gestures of a user with control commands demanded by a terminal or application program.

Another embodiment of the present invention is directed to a gesture recognizing apparatus capable of controlling a terminal and contents by recognizing a gesture of a user even though the user does not touch a terminal screen.

Another embodiment of the present invention is directed to providing a control signal generating apparatus capable of allowing easy input by defining various gestures of a user with control commands demanded by a terminal or application program.

Another embodiment of the present invention is directed to providing a computer-readable recording medium on which the program for executing the above method is stored.

In one general aspect, a method of recognizing a gesture includes: storing sensing information of a sensor in a case where the sensing information is obtained by sensing an object within a preset distance from the sensor; and recognizing a gesture from the stored sensing information, wherein said storing of sensing information stores the sensing information obtained by the sensor during a preset time after the sensor senses an object within the preset distance.

At least one sensors may be disposed out of a screen, and the gesture may be recognized by using the fact that a region where the object is sensed changes as time goes.

At least one sensors may be disposed out of a screen, and sensing regions of the at least one sensors may partially overlap each other.

A sensing direction of the sensor may be a normal direction to a screen plane.

A sensing direction of the sensor may have an angle to a normal direction of a screen plane, and a sensing region of the sensor may change according to the angle.

At least one sensors may be disposed out of a screen, and sensing regions of the at least one sensors may partially overlap each other so that the at least one sensors form a sensing region spaced apart from the screen plane by a preset distance.

The method of recognizing a gesture may further include: deleting the stored sensing information in a case where an object is sensed out of the preset distance within a preset time after the sensor senses the object within the preset distance, and then determining whether the sensing information of the sensor is obtained by sensing within the preset distance from the sensor.

In another aspect, a method of generating a control signal includes: storing sensing information of a sensor in a case where the sensing information is obtained by sensing an object within a preset distance from the sensor; recognizing a gesture from the stored sensing information; and generating a control signal corresponding to the recognized gesture, wherein said storing of sensing information stores the sensing information obtained by the sensor during a preset time after the sensor senses an object within the preset distance.

In another aspect, an apparatus of recognizing a gesture includes: a distance calculating unit for calculating whether sensing information of a sensor is obtained by sensing within a preset distance from the sensor; a storing unit for storing the sensing information in a case where the sensing information of the sensor is obtained by sensing within the preset distance from the sensor; and a gesture recognizing unit for recognizing a gesture from the stored sensing information, wherein the storing unit stores the sensing information obtained from the sensor during a preset time after the sensor senses an object within the preset distance.

In another aspect, an apparatus of generating a control signal includes: a distance calculating unit for calculating whether sensing information of a sensor is obtained by sensing within a preset distance from the sensor; a storing unit for storing the sensing information in a case where the sensing information of the sensor is obtained by sensing within the preset distance from the sensor; a gesture recognizing unit for recognizing a gesture from the stored sensing information; and a control signal generating unit for generating a control signal corresponding to the recognized gesture, wherein the storing unit stores the sensing information obtained from the sensor during a preset time after the sensor senses an object within the preset distance.

In another aspect, there is provided a computer-readable recording medium on which program for executing the gesture recognizing method and the control signal generating method by a computer is stored.

Other features and aspects will be apparent from the following detailed description, the drawings, and the claims.

BRIEF DESCRIPTION OF THE DRAWINGS

The above and other objects, features and advantages of the present invention will become apparent from the following description of certain exemplary embodiments given in conjunction with the accompanying drawings, in which:

FIG. 1 is a schematic diagram showing a potable terminal including a gesture recognizing apparatus according to an embodiment of the present invention;

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Prior to describing details of the present invention, the summary of the present invention or the essence of the technical aspect is proposed first.

A method of recognizing a gesture according to an embodiment of the present invention includes: storing sensing information of a sensor in a case where the sensing information is obtained by sensing an object within a preset distance from the sensor; and recognizing a gesture from the stored sensing information, wherein said storing of sensing information stores the sensing information obtained by the sensor during a preset time after the sensor senses an object within the preset distance.

Hereinafter, the present invention will be described in more detail based on preferred embodiments. However, those embodiments are just for detailed explanation of the present invention, and it is apparent to those having ordinary skill in the art that the scope of the present invention is not limited to the embodiments.

FIG. 1 shows a portable terminal 11 in which a gesture recognizing apparatus according to an embodiment of the present invention is included.

A screen 12 occupies the majority of the portable terminal 11, and a plurality of sensors 13, 14, 15 and 16 may be disposed at rims or edges of the portable terminal 11 or the screen 12.

The number of sensors may change depending on a screen size and a sensing range of the sensors, and the sensors may also be arranged in various ways.

Figure 2A:
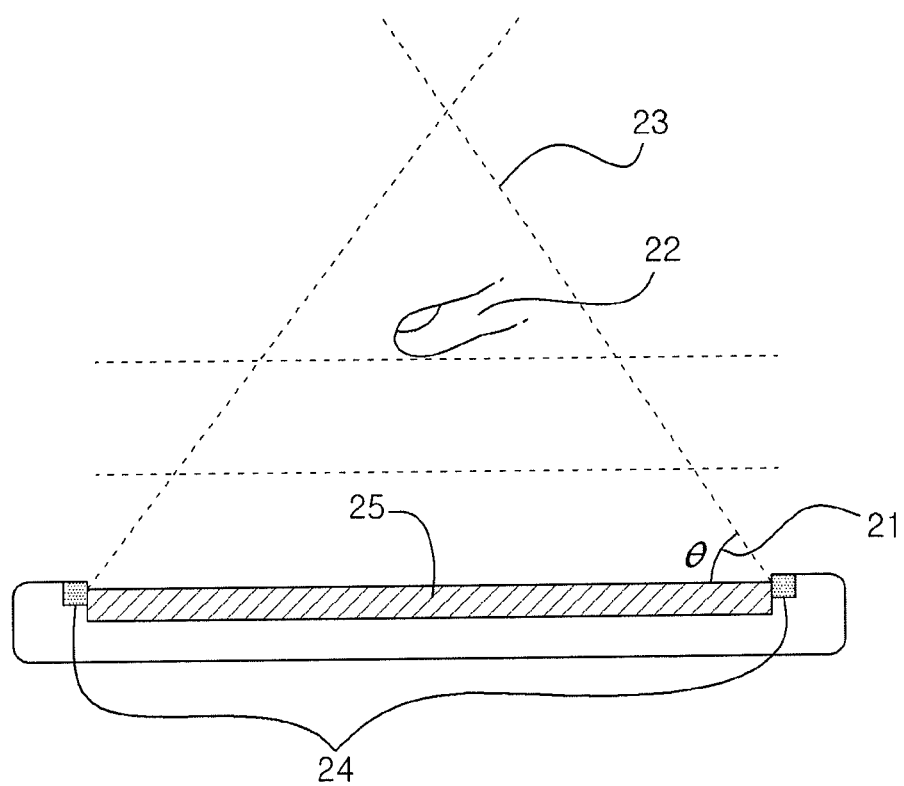
FIGS. 2a and 2b are schematic diagrams showing examples where sensors included in the gesture recognizing apparatus according to an embodiment of the present invention have a diagonal sensing direction.
Figure 2B:
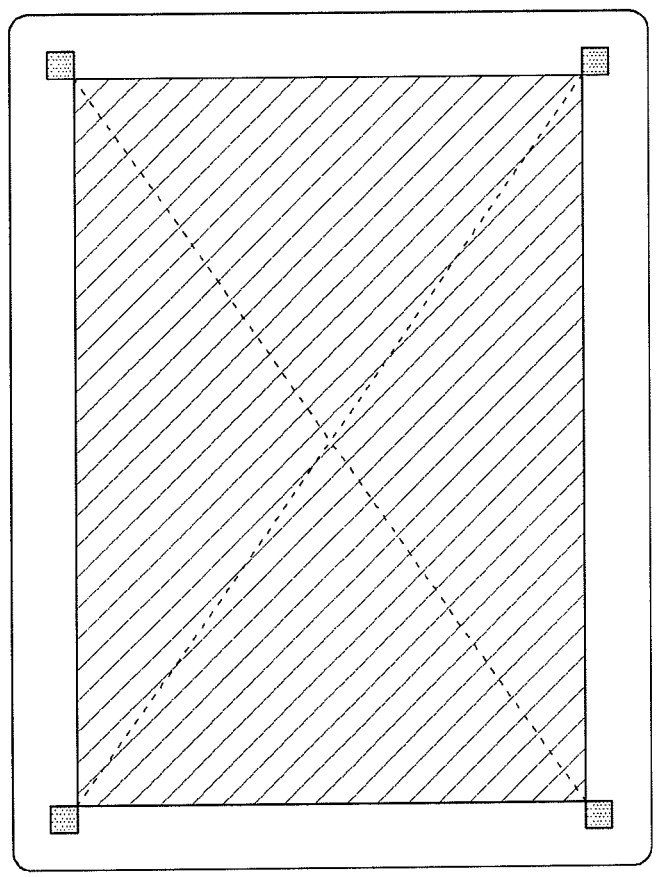

FIGS. 2a and 2b are schematic diagrams showing examples where sensors included in the gesture recognizing apparatus according to an embodiment of the present invention have a diagonal sensing direction. FIG. 2a shows the gesture recognizing apparatus observed at a side, and FIG. 2b shows the gesture recognizing apparatus observed from the above.

Referring to FIG. 2a, sensing directions of sensors 24 are set not to be a vertical direction but to be a diagonal direction 23 with a preset angle θ 21.

Referring to FIG. 2b, sensing directions of sensors cross each other to form a sensing region where an object 22 on a screen 25 may be sensed.

The sensing region may decrease or increase by adjusting the angle θ 21, and the sensing region may be formed in a specific portion.

FIGS. 3a to 3d are schematic diagrams showing examples of sensing regions when a plurality of sensors senses an object.

Sensors having different sensing regions may be disposed in consideration of a size of the screen or terminal 307 and the sensing regions 308 of the sensors 301 to 306, and the sensors may also be disposed in various ways as desired by a designer.

Figure 3A:
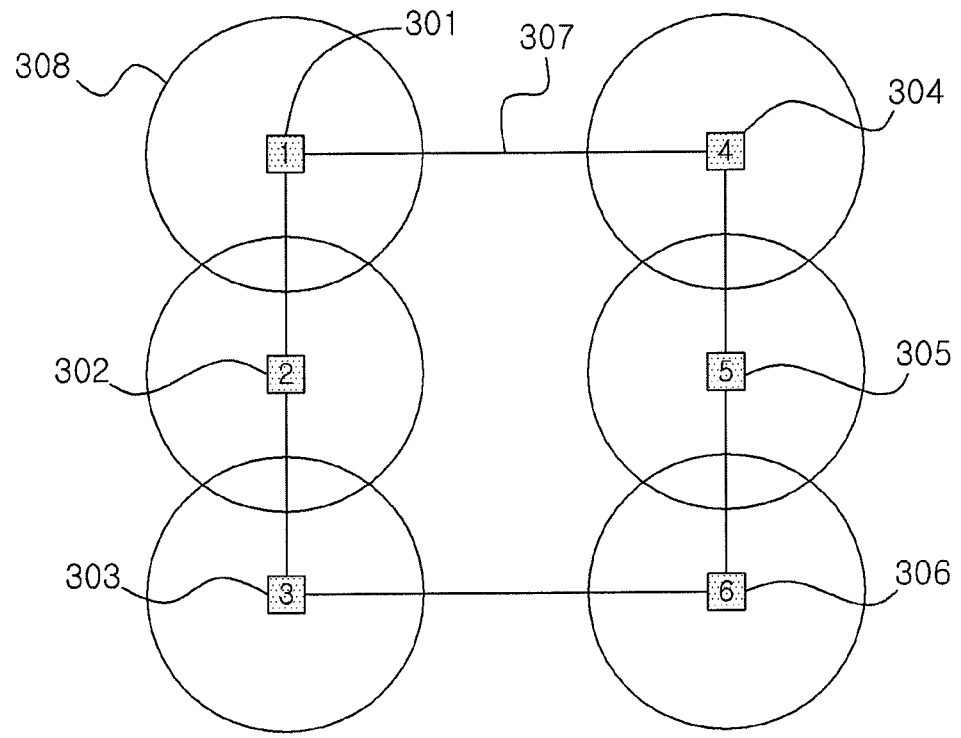
FIGS. 3a to 3d are schematic diagrams showing examples of sensing regions when a plurality of sensors senses an object.
Figure 3B:
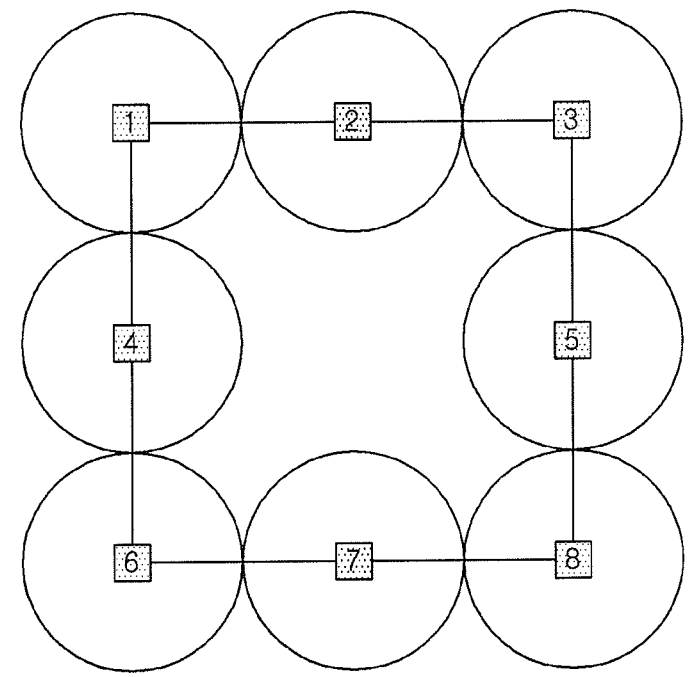

FIG. 3a shows a case where a plurality of sensors are disposed so that sensing region of the sensors partially overlap in a vertical direction, and FIG. 3b shows a case where a plurality of sensors are disposed so that their sensing regions do not overlap in a vertical direction.

Figure 3C:
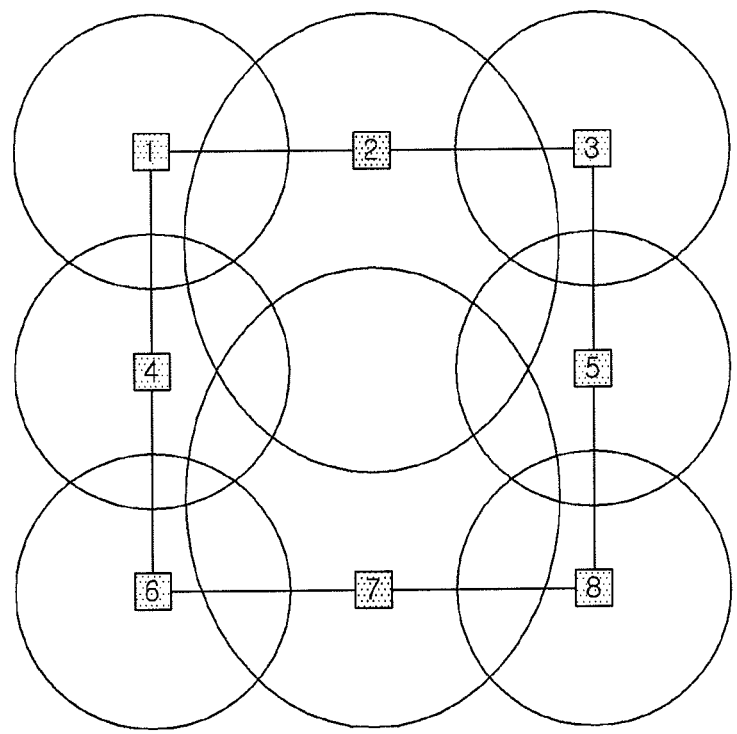

FIG. 3c shows a case where a plurality of sensors having different sensing regions are disposed so that the sensing regions cover the entire screen or terminal 307. The sensing directions of the sensors may be installed in a vertical direction or in a diagonal direction by giving a preset angle thereto.

Figure 3D:
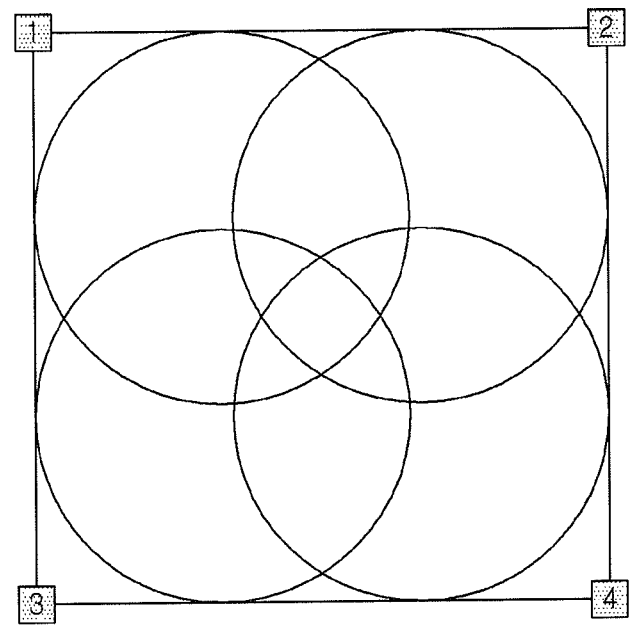

FIG. 3d shows a case where a plurality of sensors are disposed so that their sensing regions overlap each other, and where sensing directions of the sensors are set not in a vertical direction but in a diagonal direction with a set angle. In this case, the sensing regions may cover the entire screen or terminal 307 even though a small number of sensors are used.

Figure 4:
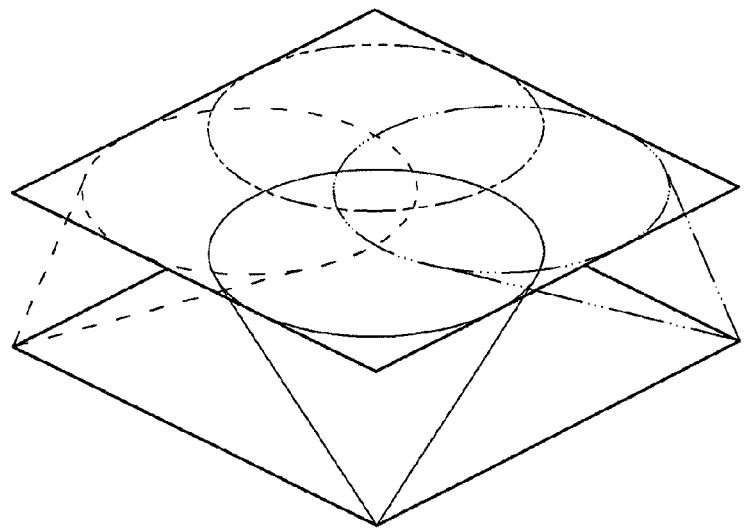
FIG. 4 is a schematic diagram showing a sensing region formed on a terminal when a sensor is installed with an inclined sensing direction as shown in FIG. 3d.

FIG. 4 is a schematic diagram showing a sensing region formed on a terminal when a sensor is installed with an inclined sensing direction as shown in FIG. 3d.

Figure 5A:
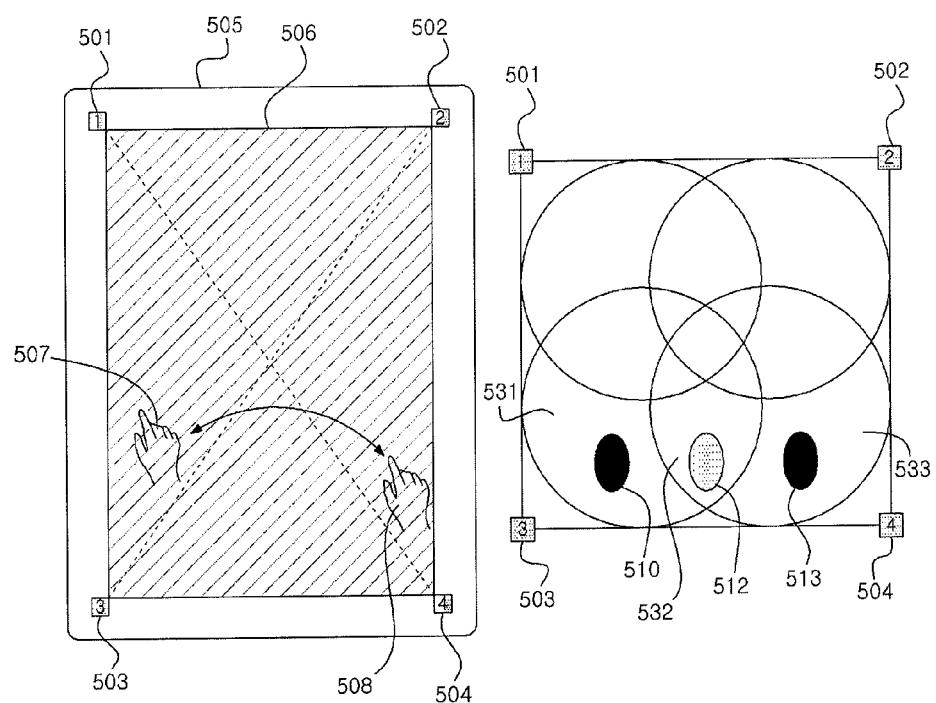
FIGS. 5a and 5b are schematic diagrams showing an example of a gesture recognizing method according to an embodiment of the present invention when the sensing region is formed as shown in FIG. 4.
Figure 5B:
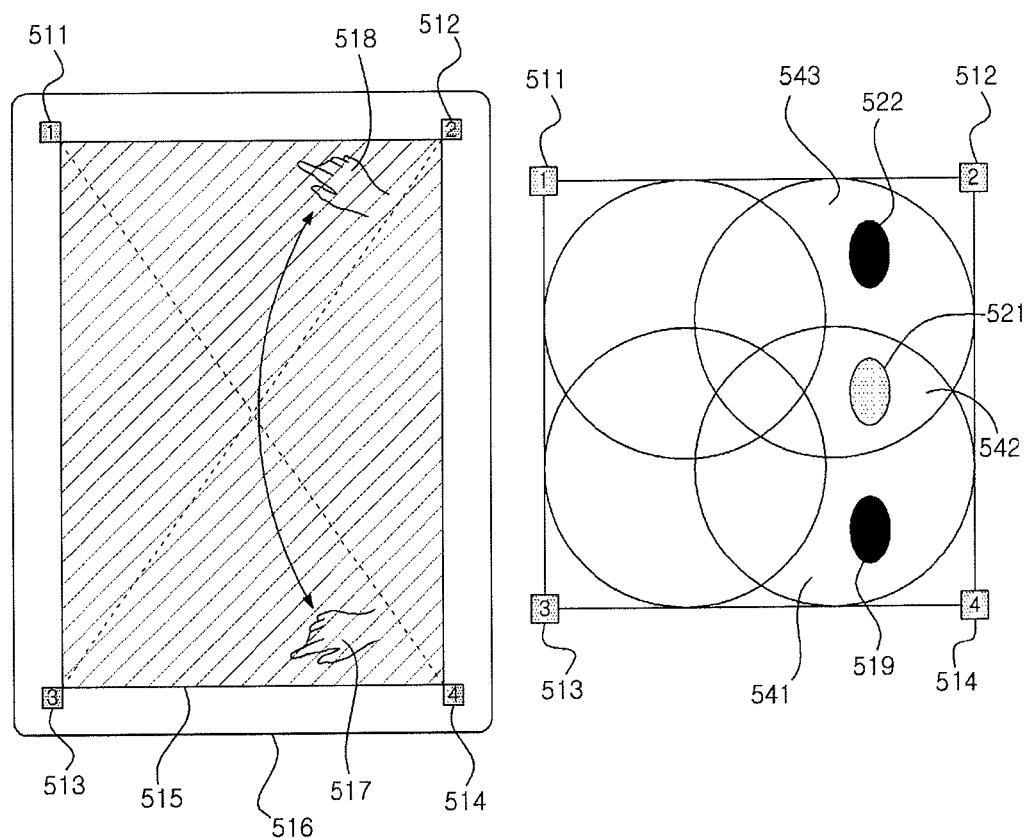

FIGS. 5a and 5b are schematic diagrams showing an example of a gesture recognizing method according to an embodiment of the present invention when the sensing region is formed as shown in FIG. 4;

FIG. 5a shows an example of a method of recognizing a gesture moving from left to right or from right to left.

If an object moves from left 507 to right 508, the object is sensed (510) in a sensing region 531 of a third sensor 503, and therefore it may be recognized that the object is located at a lower left side.

If the object passes through the lower center while moving from left to right, the object may be sensed (512) in a sensing region 532 where sensing regions of the third sensor 503 and a fourth sensor 504 overlap each other. In addition, if the object completely moves to right, the object is sensed (513) only in a sensing region 532 of the fourth sensor 504, and therefore it may be recognized that the object is located at a lower right side.

If the location of the sensed object moves in the order of 510→512→513, the motion may be defined and recognized as a gesture moving from left to right, and it may substitute for an existing arrow key function for the movement from left and right.

FIG. 5b shows an example of a method of recognizing a gesture moving from top to bottom or from bottom to top.

If the object moves from bottom 517 to top 518, the object is sensed (519) in a sensing region 541 of a fourth sensor 514, and therefore it may be recognized that the object is located at a lower right side.

If the object passes through a middle right side while moving from bottom to top, the object may be sensed (521) in a sensing region 542 where sensing regions of a second sensor 512 and the fourth sensor 514 overlap each other. In addition, if the object completely moves to the top, the object is sensed (522) only in the sensing region 543 of the second sensor 512, and therefore it may be recognized that the object is located at an upper right side.

If the location of the sensed object moves in the order of 519→521→522, the motion may be defined and recognized as a gesture moving from bottom to top, and it may substitute for an existing arrow key function for the movement from bottom and top. In addition, this gesture may correspond to a command such as upper or lower scrolling or page up/down in an application program.

Similarly, a diagonal gesture or a circular gesture may also be recognized based on sensing information of the sensors.

Figure 6:
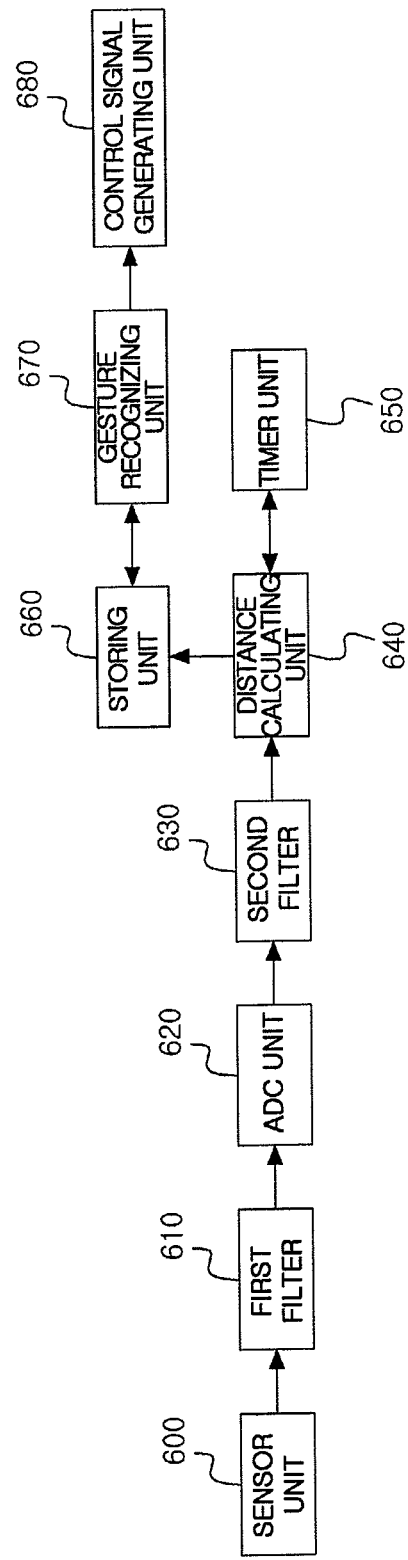
FIG. 6 is a block diagram showing the gesture recognizing apparatus according to an embodiment of the present invention.

FIG. 6 is a block diagram showing the gesture recognizing apparatus according to an embodiment of the present invention;

Referring to FIG. 6, the gesture recognizing apparatus of this embodiment includes a sensor unit 600, a first filter 610, an ADC unit 620, second filter 630, a distance calculating unit 640, a timer unit 650, a storing unit 660, a gesture recognizing unit 670, and a control signal generating unit 680.

The sensor unit 600 senses an object which approaches a screen or terminal plane. At this time, the sensing direction of the sensor unit 600 may be set to be a vertical direction or to be a diagonal direction by giving a preset angle. In addition, the sensor unit 600 is composed of at least one sensors which are disposed so that sensing regions of the sensors overlap each other, as shown in FIGS. 1 and 3 as examples. Sensors of the sensor unit 600 are preferably proximity sensors.

The first filter 610 removes noise of analog data obtained by the sensor unit 600.

The ADC unit 620 converts the analog data obtained by the sensor unit 600 into digital data.

The second filter 630 removes noise of the digital data. The first filter 610 and the second filter 630 may be configured as hardware or software.

The distance calculating unit 640 calculates a distance between an approaching object and the screen or terminal plane by using the sensing data received by the second filter 630.

If the distance calculated by the distance calculating unit 640 using the sensing data is within a preset distance from the screen or terminal plane, the signal for operating a timer is transmitted to the timer unit 650, and the sensing data is stored in the storing unit 660.

However, if the distance calculated by the distance calculating unit 640 using the sensing data is out of the preset distance from the screen or terminal plane, the received sensing data is ignored.

If the timer operating signal is received from the distance calculating unit 640, the timer unit 650 operates the timer for a preset time. Here, the preset time means a time receiving the sensing data necessary to recognize a gesture from the sensing data. If the sensing data is received during a time shorter than the preset time, the gesture recognizing unit 670 will not recognize a gesture.

The storing unit 660 stores the sensing data obtained within the preset distance as calculated by the distance calculating unit 640 for a time preset by the timer unit 650.

The gesture recognizing unit 670 recognizes a gesture from the sensing data stored in the storing unit 660 for a time preset by the timer unit 650.

In addition, the gesture recognizing unit 670 may analyze a moving path and velocity of the gesture or proximity to the screen based on the sensing data of the sensors which are generated when a gesture occurs in the sensing region.

The control signal generating unit 680 generates a control signal from the gesture recognized by the gesture recognizing unit 670. If a gesture is recognized, it is determined whether the corresponding gesture is connected to a control command defined in an application program or contents, and if there is a connected command, the control signal generating unit 680 may generate a control signal.

Figure 7:
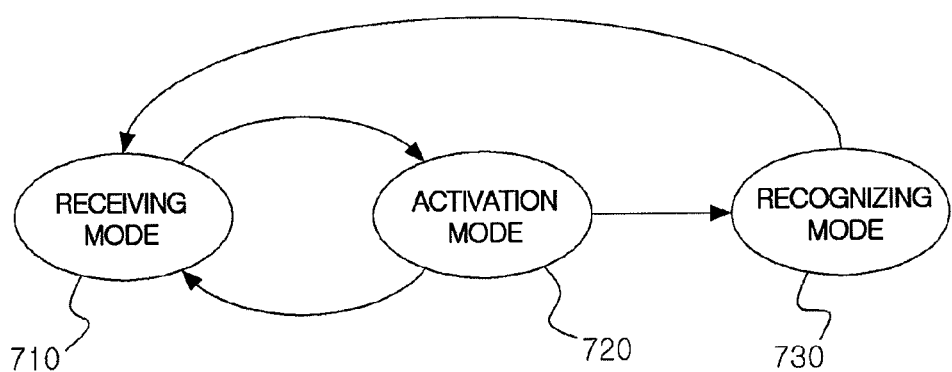
FIG. 7 is a schematic diagram showing the change of state of the gesture recognizing apparatus according to an embodiment of the present invention.

FIG. 7 is a schematic diagram showing the change of state of the gesture recognizing apparatus according to an embodiment of the present invention.

The gesture recognizing apparatus according to an embodiment of the present invention is in a receiving mode 710 in which the gesture recognizing apparatus stands by at an initial or ordinary time until sensing information is generated by the sensor.

If sensing information is received from the sensor and the received sensing information is obtained within the preset distance, the mode shifts to an activation mode 720 so that the sensing information is received and stored for a preset time.

If the sensing information received in the activation mode 720 for a preset time is obtained out of the preset distance, the mode shifts to the receiving mode 710 again. When shifting to the receiving mode 710, the sensing information stored in the activation mode 720 may be deleted and initialized.

If a preset time passes in the activation mode 720, the mode shifts to a recognizing mode 730, and a gesture is recognized from the sensing formation stored in the activation mode 720.

If a gesture is recognized and a control signal corresponding to the recognized gesture is generated in the recognizing mode 730, the gesture recognizing apparatus according to the embodiment of the present invention shifts to the receiving mode 710 again and stands by until sensing information is generated.

Figure 8:
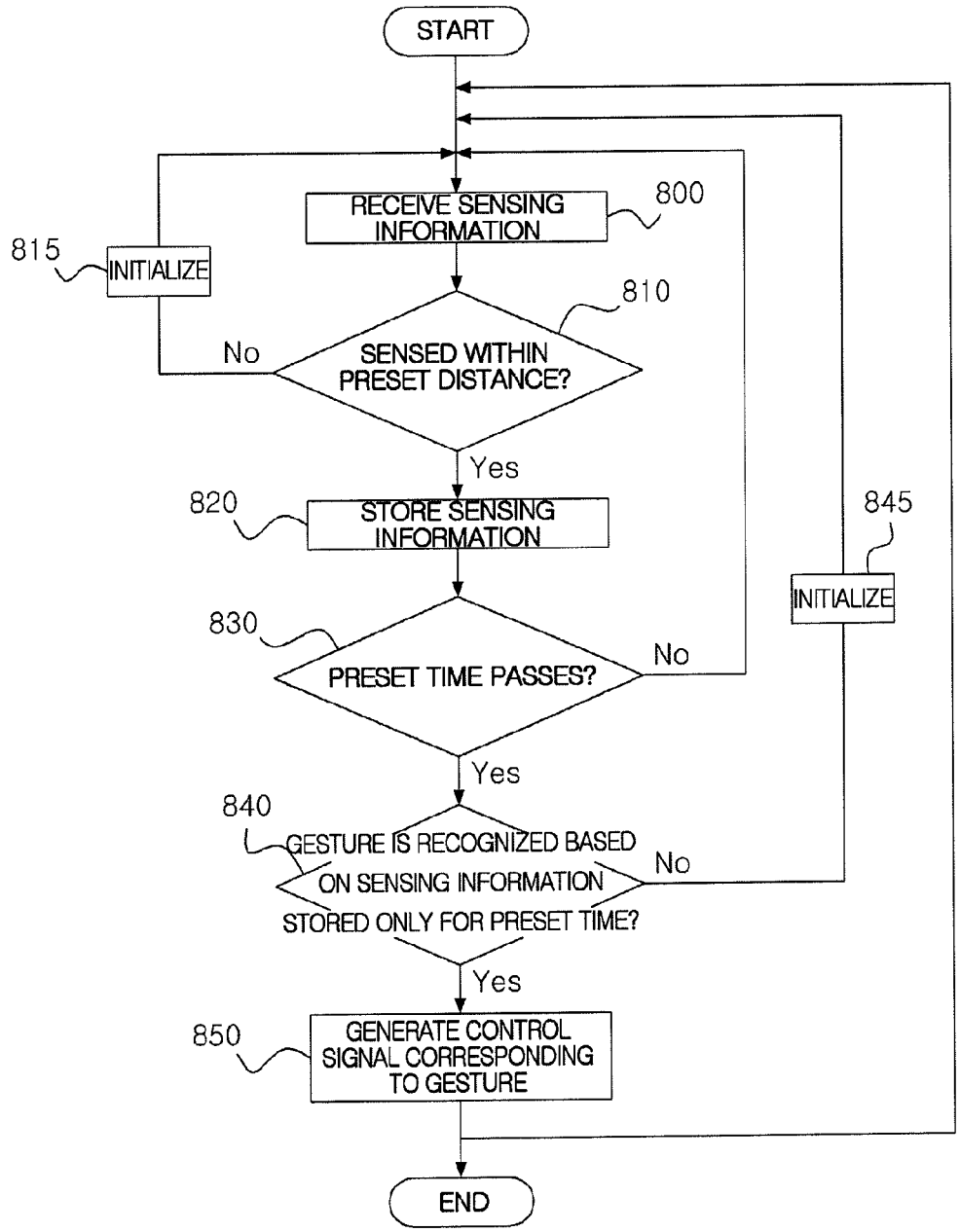
FIG. 8 is a flowchart illustrating a gesture recognizing method according to an embodiment of the present invention.

FIG. 8 is a flowchart illustrating a gesture recognizing method according to an embodiment of the present invention.

Referring to FIG. 8, the gesture recognizing method according to this embodiment includes time-series processes performed by the gesture recognizing apparatus shown in FIG. 7. Therefore, though not described below, the features described above in relation to the gesture recognizing apparatus shown in FIG. 7 are also applied to the gesture recognizing method of this embodiment.

In operation 800, the gesture recognizing apparatus receives sensing information in the receiving mode. The gesture recognizing apparatus receives sensing information while initially waiting for sensing information obtained by the sensor in the receiving mode.

In operation 810, the gesture recognizing apparatus determines whether the sensing information received in operation 800 is obtained within a preset distance.

The preset distance may be set in various ways. For example, a vertical distance from the surface of a display of a terminal to the sensed object may be the preset distance. Therefore, the preset distance may be expressed as proximity representing how the object is close to the display surface.

When determining whether the object is sensed within the preset distance, it may be determined that the object is sensed within the preset distance if the object is sensed within a region from the display surface up to the preset distance.

If it is determined that the object is not sensed within the preset distance, the process proceeds to operation 815. If the object is sensed within the preset distance, the process proceeds to operation 820.

In operation 815, the gesture recognizing apparatus initializes the stored sensing information.

In operation 820, the gesture recognizing apparatus stores sensing information.

In operation 830, the gesture recognizing apparatus determines whether a preset time passes after the sensing information is received within the preset distance.

If it is determined that the preset time does not pass, the process proceeds to operation 800 to receive sensing information. If it is determined that the preset time passes, the process proceeds to operation 840.

After that, it is determined whether a gesture may be recognized in a case where the sensing information is sensed for a preset time within the preset distance. At this time, a timer may be used to check whether the preset time passes.

In operation 840, the gesture recognizing apparatus determines whether a gesture may be recognized based on the sensing information stored for the preset time.

If it is determined that a gesture may not be recognized, the process proceeds to operation 845. If it is determined that a gesture may be recognized, the process proceeds to operation 850.

In operation 845, the gesture recognizing apparatus initializes the stored sensing information.

In operation 850, the gesture recognizing apparatus generates a control signal corresponding to the recognized gesture.

The gesture recognizing apparatus generates a control signal corresponding to the recognized gesture, and then proceeds to operation 800 again to be operated in the receiving mode for receiving sensing information.

Figure 9:
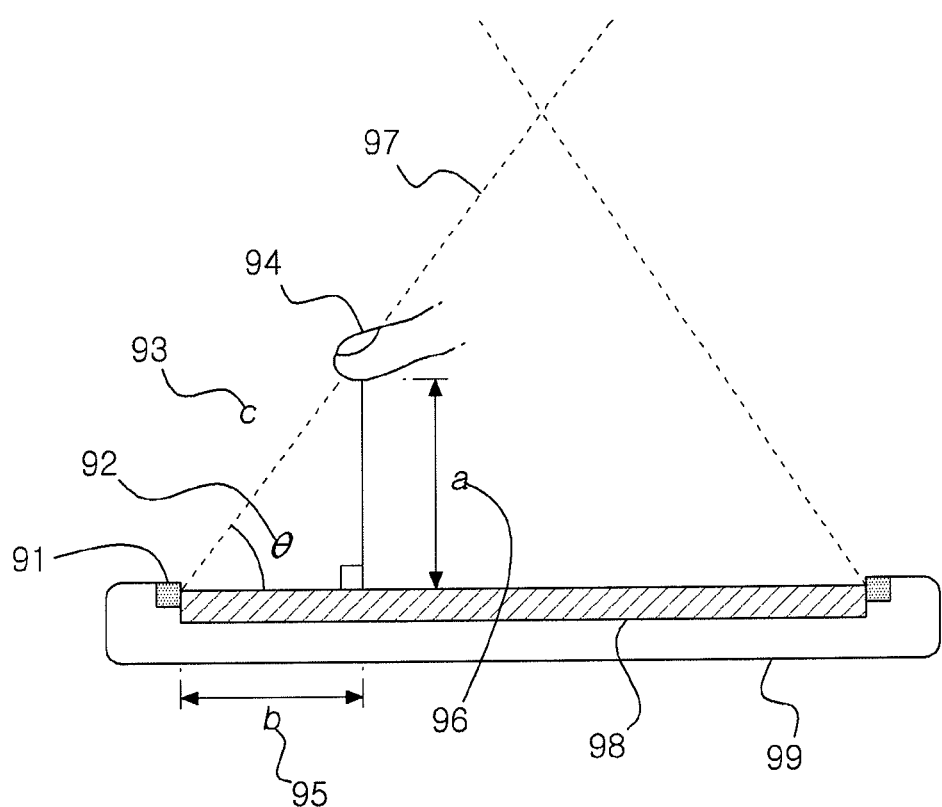
FIG. 9 is a schematic diagram showing a condition which shifts a receiving mode 710 to an activation mode 720 in FIG. 7.

FIG. 9 is a schematic diagram showing a condition which shifts the receiving mode 710 to the activation mode 720 in FIG. 7.

When an object 94 enters a sensing range of a sensor 91, an approach distance a 96 of the object 94 is obtained. If the approach distance a of the object is smaller than a predefined distance from a terminal 99 or a screen 98, the mode shifts to the activation mode, and the gesture recognizing apparatus according to the embodiment of the present invention stores sensing information received afterwards.

The approach distance a 96 of the object 94 may be obtained by using a preset sensing direction angle 92 of the sensor and a distance c between the sensor 91 and the object 94, which may be obtained from the sensor 91.

The embodiments of the present invention may be implemented as program commands which may be performed by various kinds of computer means, and be recorded on a computer-readable recording medium. The computer-readable recording medium may include program commands, data files, data structures and so on, solely or in combination. The program commands recorded on the medium may be specially designed or configured for the present invention or well known to and available by persons skilled in the computer software art. The computer-readable recording medium include, for example, magnetic media such as hard disk, floppy disk and magnetic tape; optical media such as CD-ROM and DVD; magneto-optical media such as floptical disk; and hardware devices specially configured for storing and executing program commands such as ROM, RAM and flash memory. The program command includes, for example, machine language codes made by a compiler and high-level language codes which may be executed by a computer by using an interpreter. The hardware device may be configured to be operated as one or more software modules in order to perform the operations of the present invention, or vice versa.

According to the present invention, a terminal and contents may be controlled by recognizing a gesture of a user even though the user does not touch a terminal screen. In addition, according to the present invention, various gestures of the user may be easily input by being defined with control commands demanded by a terminal or application program.

Though the present invention has been described above based on limited embodiments and drawings and specific limitations such as detailed components, the above disclosure is provided just for better understanding of the present invention, and the present invention is not limited to the embodiments. The present invention can be changed or modified in various ways from the above disclosure by those having ordinary skill in the art.

Therefore, the spirit of the present invention should not be limited to the above embodiments, and the equivalents and equivalent modifications of the claims should be considered as being included in the scope of the present invention.

What is claimed is:

1. A method of recognizing a gesture, comprising:
storing sensing information of at least two sensors in a case where the sensing information is obtained by sensing an object within a sensing region of at least one of the at least two sensors defined as a preset distance from a screen; and
recognizing a gesture from the stored sensing information, wherein said storing of sensing information stores the sensing information obtained by the at least two sensors during a preset time which represents a time receiving the sensing information necessary to recognize the gesture from the sensing information after the at least one of the at least two sensors senses an object within the sensing region, wherein the gesture can be recognized when the sensing information is received during a time greater than or equal to the preset time, wherein at least one of the at least two sensors is disposed out of the screen, and wherein the gesture is recognized by using the fact that the sensing region where the object is sensed changes over time.

2. The method of recognizing a gesture according to claim 1, wherein sensing regions of the at least two sensors partially overlap each other.

3. The method of recognizing a gesture according to claim 1, wherein a sensing direction of the at least two sensors is a normal direction to a screen plane.

4. The method of recognizing a gesture according to claim 1, wherein a sensing direction of each of the at least two sensors has an angle to a normal direction of a screen plane, and sensing regions of the at least two sensors change according to the angle of each sensor.

5. The method of recognizing a gesture according to claim 1, wherein sensing regions of the at least two sensors partially overlap each other so that the at least two sensors form a combined sensing region spaced apart from the screen plane by a preset distance.

6. The method of recognizing a gesture according to claim 1, further comprising deleting the stored sensing information in a case where an object is sensed out of the preset distance within a preset time after the at least one of the at least two sensors senses the object within the preset distance, and then determining whether the sensing information of the at least one of the at least two sensors is obtained by sensing within the preset distance from the screen.

7. A method of generating a control signal, comprising:

storing sensing information of at least two sensors in a case where the sensing information is obtained by sensing an object within a sensing region of at least one of the at least two sensors defined as a preset distance from a screen;

recognizing a gesture from the stored sensing information; and generating a control signal corresponding to the recognized gesture, wherein said storing of sensing information stores the sensing information obtained by the at least two sensors during a preset time which represents a time receiving the sensing information necessary to recognize the gesture from the sensing information after the at least one of the at least two sensors senses an object within the sensing region, wherein the gesture can be recognized when the sensing information is received during a time greater than or equal to the preset time, wherein at least one of the at least two sensors is disposed out of the screen, and wherein the gesture is recognized by using the fact that the sensing region where the object is sensed changes over time.

8. An apparatus of recognizing a gesture, comprising:

a distance calculating unit for calculating whether sensing information of at least two sensors is obtained by sensing within a sensing region of at least one of the at least two sensors defined as a preset distance from a screen;

a storing unit for storing the sensing information in a case where the sensing information of the at least two sensors is obtained by sensing within the sensing region of the at least one of the at least two sensors; and a gesture recognizing unit for recognizing a gesture from the stored sensing information, wherein the storing unit stores the sensing information obtained from the at least two sensors during a preset time which represents a time receiving the sensing information necessary to recognize the gesture from the sensing information after the at least one of the at least two sensors senses an object within the sensing region, wherein the gesture can be recognized when the sensing information is received during a time greater than or equal to the preset time wherein at least one of the at least two sensors is disposed out of the screen, and wherein the gesture is recognized by using the fact that the sensing region where the object is sensed changes over time.

9. The apparatus of recognizing a gesture according to claim 8, wherein sensing regions of the at least two sensors partially overlap each other.

10. The apparatus of recognizing a gesture according to claim 8, wherein a sensing direction of the at least two sensors is a normal direction to a screen plane.

11. The apparatus of recognizing a gesture according to claim 8, wherein a sensing direction of each of the at least two sensors has a preset angle to a normal direction of a screen plane, and sensing regions of the at least two sensors change according to the angle of each sensor.

12. The apparatus of recognizing a gesture according to claim 8, wherein sensing regions of the at least two sensors partially overlap each other so that the at least two sensors form a combined sensing region spaced apart from the screen plane by a preset distance.

13. The apparatus of recognizing a gesture according to claim 8, wherein the distance calculating unit deletes the stored sensing information in a case where an object is sensed out of the preset distance within a preset time after the at least one of the at least two sensors senses the object within the preset distance, and then determines whether the sensing information of the at least one of the at least two sensors is obtained by sensing within the preset distance from the screen.

14. An apparatus of generating a control signal, comprising:

a distance calculating unit for calculating whether sensing information of at least two sensors is obtained by sensing within a sensing region of at least one of the at least two sensors defined as a preset distance from a screen;

a storing unit for storing the sensing information in a case where the sensing information of the at least two sensors is obtained by sensing within the sensing region of the at least one of the at least two sensors;

a gesture recognizing unit for recognizing a gesture from the stored sensing information; and a control signal generating unit for generating a control signal corresponding to the recognized gesture, wherein the storing unit stores the sensing information obtained from the at least two sensors during a preset time which represents a time receiving the sensing information necessary to recognize the gesture from the sensing information after the at least one of the at least two sensors senses an object within the sensing region, wherein the gesture can be recognized when the sensing information is received during a time greater than or equal to the preset time, wherein at least one of the at least two sensors is disposed out of the screen, and wherein the gesture is recognized by using the fact that the sensing region where the object is sensed changes over time.

15. A computer program product comprising at least one non-transitory computer-readable storage medium having computer-executable program code portions stored therein, the computer-executable program code portions comprising program code instructions for:

storing sensing information of at least two sensors in a case where the sensing information is obtained by sensing an object within a sensing region of at least one of the at least two sensors defined as a preset distance from a screen; and recognizing a gesture from the stored sensing information, wherein said storing of sensing information stores the sensing information obtained by the at least two sensors during a preset time which represents a time receiving the sensing information necessary to recognize a gesture from the sensing information after the at least one of the at least two sensors senses an object within the sensing region, wherein the gesture can be recognized when the sensing information is received during a time greater than or equal to the preset time, wherein at least one of the at least two sensors is disposed out of the screen, and wherein the gesture is recognized by using the fact that the sensing region where the object is sensed changes over time.

16. A computer program product comprising at least one non-transitory computer-readable storage medium having computer-executable program code portions stored therein, the computer-executable program code portions comprising program code instructions for:

storing sensing information of at least two sensors in a case where the sensing information is obtained by sensing an object within a sensing region of at least one of the at least two sensors defined as a preset distance from a screen;

recognizing a gesture from the stored sensing information; and generating a control signal corresponding to the recognized gesture, wherein said storing of sensing information stores the sensing information obtained by the at least two sensors during a preset time which represents a time receiving the sensing information necessary to recognize the gesture from the sensing information after the at least one of the at least two sensors senses an object within the sensing region, wherein the gesture can be recognized when the sensing information is received during a time greater than or equal to the preset time wherein at least one of the at least two sensors is disposed out of the screen, and wherein the gesture is recognized by using the fact that the sensing region where the object is sensed changes over time.

* * * * *